United States Patent
Koch et al.

(10) Patent No.: US 6,818,884 B2
(45) Date of Patent: Nov. 16, 2004

(54) OPTOELECTRONIC SENSOR HAVING TRANSPARENT COVER SHAPED AS LIGHT DEFLECTING ELEMENT

(75) Inventors: Holger Koch, Unna (DE); Ralf Bobel, Dortmund (DE); Andreas Muller, Menden (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 200 days.

(21) Appl. No.: 10/236,246

(22) Filed: Sep. 6, 2002

(65) Prior Publication Data

US 2003/0047668 A1 Mar. 13, 2003

(30) Foreign Application Priority Data

Sep. 7, 2001 (DE) .......................................... 101 44 147

(51) Int. Cl.[7] .................................................. H01J 40/14
(52) U.S. Cl. .................. 250/239; 250/221; 250/231.13; 356/215
(58) Field of Search ................................ 250/239, 216, 250/208.1, 551, 221, 231.13, 231.14; 356/213, 218, 222, 225; 341/11, 13

(56) References Cited

U.S. PATENT DOCUMENTS

| 5,661,303 A | * | 8/1997 | Teder ....................... 250/341.8 |
| 6,534,762 B1 | * | 3/2003 | Kieselbach et al. ..... 250/231.13 |
| 2004/0011949 A1 | * | 1/2004 | Bluemcke et al. .......... 250/239 |

FOREIGN PATENT DOCUMENTS

| DE | 197 42 093 | 3/1999 |
| DE | 199 42 323 A1 | 9/1999 |

* cited by examiner

Primary Examiner—Kevin Pyo
(74) Attorney, Agent, or Firm—Brooke Kushman P.C.

(57) ABSTRACT

An optoelectronic sensor includes optoelectronic converter elements having photosensitive surfaces arranged in a one or two dimensional array. A transparent cover protects the photosensitive surfaces of the optoelectronic converter elements. At least one portion of the transparent cover is shaped to include a light deflecting element such as a prism which enables the optoelectronic converter elements to be exposed to light beams coming from different directions.

9 Claims, 1 Drawing Sheet

OPTOELECTRONIC SENSOR HAVING TRANSPARENT COVER SHAPED AS LIGHT DEFLECTING ELEMENT

BACKGROUND OF THE INVENTION

1. Field of the Invention

The object of the invention is an optoelectronic sensor with a multiplicity of optoelectronic converter elements, placed in a one- or two-dimensional array and having a transparent cover that serves to protect the photosensitive surface of the converter elements.

In addition, the invention pertains to a preferred use of such an optoelectronic sensor, as well as to a steering angle sensor that works optoelectronically, having a photosensitive sensor, structured from a multiplicity of optoelectronic converter elements, placed in a one- or two-dimensional array and having a transparent cover that serves to protect the photosensitive surface of the converter elements, with a code disk, illuminated by a light source, for imaging the code on the photosensitive surface of the sensor, with a device, working optoelectronically, for counting cycles, whereby the code of the code disk and the code of a cycle-counting element impinge upon the sensor from various directions, and with means for deflecting the light beams of a code in the direction towards the photosensitive surface of the sensor.

2. Background Art

Optoelectronic sensors include a multiplicity of optoelectronic converter elements placed adjacent to each other in a one- or two-dimensional arrangement. For that reason, such sensors are also termed line or camera sensors. Such sensors are used for converting light information in the form of images or signals into electrical signals. For example, these sensors are used in a motor vehicle, for example, as part of a rain sensor, a steering angle sensor system or even as a distance detection device. Normally, each sensor arrangement contains its own photosensitive sensor as a receiver whose converter elements are placed in a housing. The photosensitive surface is protected by a transparent cover.

It has become known from DE 197 42 093 A1 that a single sensor can also be employed in order to be utilized as a photosensitive receiver for various imaging systems, whereby these imaging systems can image on both different and on similar converter elements or converter element groups. For this purpose, added in front of the array found in a housing is a device. The device is termed a multifunction optical system in this document and can contain light-guiding and/or light-deflecting means. This multifunction optical system is mounted independently of the sensor.

In the case of optoelectronically functioning steering angle sensors for motor vehicles, there exists a need to be able to detect, on a single optoelectronic sensor, the encoded light information of an illuminated code disk as well as the light information of a cycle-counting device. Due to the limited amount of installation space available in this region located beneath the steering wheel, the joint use of a single sensor array as a photosensitive receiver for the two detector units—code disk and cycle counter—by placing in front of it a multifunction optical system known from DE 197 42 093 A1 cannot be implemented easily. The same also holds true for other arrangements in which only a very small amount of installation space is available and the light directed to the sensor comes from various directions.

SUMMARY OF THE INVENTION

Starting from the state of the art as discussed above, the invention therefore performs the task of further developing the optoelectronic sensor described above in such a way that the disadvantages discussed with regard to the previously known state of the art are avoided, and specifically, in such a way that the sensor is suitable for detecting both the optical information of a code disk as well as that of a cycle counting device within the context of a steering angle sensor system in a motor vehicle.

According to the invention, this task is carried out as the transparent cover of the sensor consisting of one or more light-deflecting elements so that the converter elements of the array can be exposed to light beams coming from different directions.

In addition, according to the invention this task is performed through the further development of an optoelectronic steering angle sensor of the type mentioned above, in that a part of the transparent array cover is at least one light-deflecting element for deflecting the light stream of a code so that the converter elements of the array can be exposed to light beams coming from different directions.

With the sensor according to the invention—in contrast to the known state of the art—no additional, separate light-deflecting means are used, instead, they are part of a cover that protects the photosensitive surface of the converter elements and is present in any event. This cover can—as is provided in an embodiment—be part of a housing that entirely encloses the array. The light-deflecting elements can be designed to be light-refractive, for example, or even light-reflective. In the case of light-deflecting elements that are designed to be light-reflecting, the cover or the housing can have internal reflection surfaces, for example, at which the light streams coming from lateral directions are reflected to the photosensitive surface of the sensor array's converter elements. These reflection surfaces are typically part of a prism. The light-deflecting elements are advantageously placed lateral to the perpendicular of the photosensitive surfaces of the converter elements so that exposure of the converter elements to light can take place from the perpendicular direction and from one or more lateral directions. When such a sensor is used within the context of a steering angle sensor system, the sensor that is being used as the photosensitive receiver is, for example, exposed to light in perpendicular fashion by the light code allowed through by the code disk, while a lateral impingement by light is provided via a cycle-counting element of a cycle-counting device.

The advantages of the optoelectronic sensor according to the invention lie in particular in possible miniaturization, since additional structures for the light-deflecting elements are not needed. When such a sensor is used within the context of a steering angle sensor system, the code disk can also be directed past at a very short distance so that the coding's image sharpness is not negatively affected. Along with a preferred use of the sensor array within the context of a steering angle sensor system, it is also well-suited for placement in other travel or angle measurement devices that work optoelectronically.

DETAILED DESCRIPTION OF THE PREFERRED EMBODIMENT(S)

Figure 1:
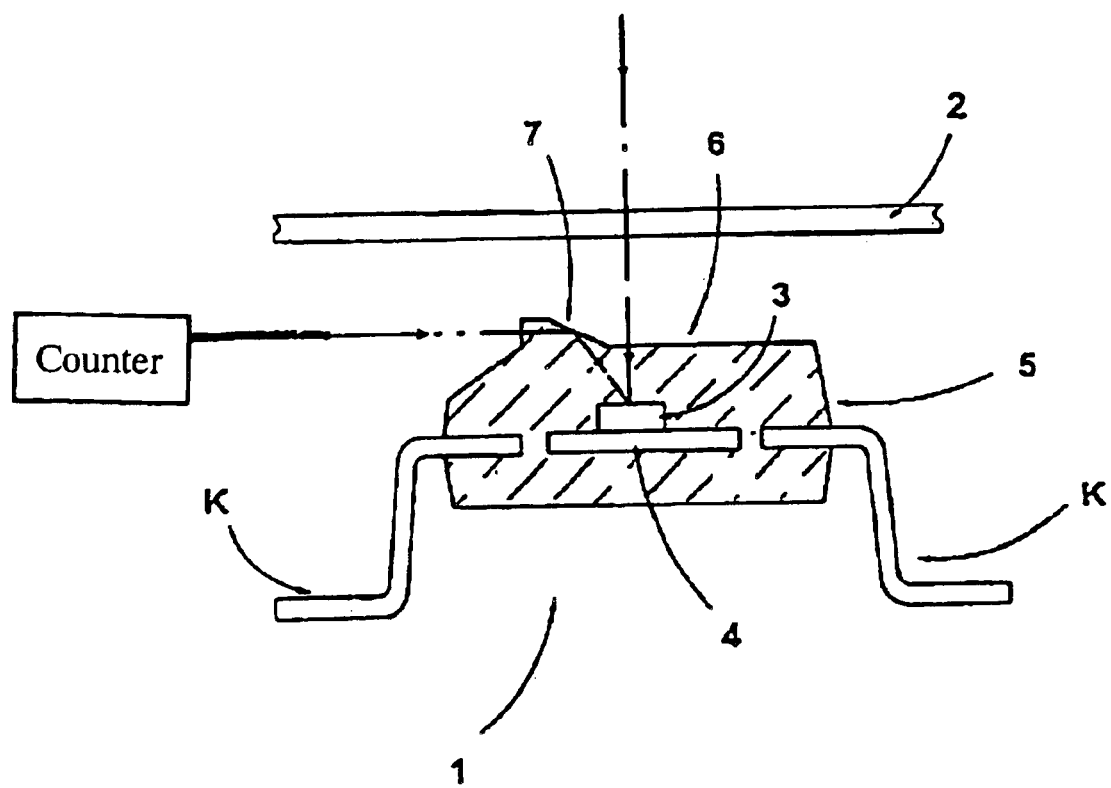
FIG. 1 illustrates a schematic representation of a cross-section through an optoelectronic sensor in accordance with the present invention.

Referring now to FIG. 1, a schematic representation of a cross-section through an optoelectronic sensor 1, which is part of a steering angle sensor system that is not additionally represented, is shown. For orientation purposes, a code disk 2 for detecting the rotational position of code disk 2 relative to sensor 1 is also shown above the sensor. Sensor 1 includes a multiplicity of individual converter elements 3 that are placed adjacent to each other in a series and are mounted on a carrier 4. Sensor 1 is thus a line sensor. Converter elements 3 are connected electrically with contact bases K, by means of which sensor 1 is mounted on a printed circuit board. Converter elements 3 that are placed on carrier 4 are placed inside a transparent housing 5, from which contact bases K are directed outward.

Part of housing 5 is a cover 6. Cover 6 is placed above the photosensitive surface of converter elements 3 and is specifically used to protect the converter elements. In the region of cover 6, the outside of housing 5 is shaped to form a light-deflecting element 7. Used as light-deflecting element 7 in the embodiment shown in FIG. 1 is a prism, to which light information from a cycle counter (not shown) is sent from a lateral direction. Relative to the one perpendicular light exposure of sensor 1, light-deflecting element 7 is placed adjacent to converter elements 3 and is configured inclined, so that the light information that is coming from the cycle-counting device from lateral directions and is sent to prism 7 is reflected towards the photosensitive surface of converter elements 3. The placement of prism 7 adjacent to the perpendicular to the photosensitive surface of converter elements 3 allows light exposure of the photosensitive surface of the converter elements from the perpendicular direction as well. Converter elements 3 are exposed to light coming from this direction by the light allowed through by code disk 2 in order to detect the rotation position of the code disk to sensor 1.

Exposure of converter elements 3 to light via the two encodings can take place simultaneously on different converter elements or else on the same converter elements in chronologically alternating fashion in accordance with a predetermined light exposure cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An optoelectronic sensor comprising:
   a plurality of optoelectronic converter elements having photosensitive surfaces arranged in an array having a number of dimensions, where the number is selected from the group consisting of one and two; and
   a transparent cover entirely enclosing the optoelectronic converter elements including the photosensitive surfaces of the optoelectronic converter elements in order to protect the photosensitive surfaces of the optoelectronic converter elements, wherein at least one portion of the transparent cover includes a light deflecting element which enables the photosensitive surfaces of the optoelectronic converter elements to be exposed to light beams coming from different directions.

2. The sensor of claim 1 wherein:
   the light deflecting element enables the same optoelectronic converter elements to be exposed to light beams coming from different directions.

3. The sensor of claim 1 wherein:
   the light deflecting element is a prism.

4. An optoelectronic sensor for determining the angle of a steering wheel, the sensor comprising:
   a photosensitive sensor having a photosensitive surface formed from a plurality of optoelectronic converter elements placed in an array having a number of dimensions, wherein the number is selected from the group consisting of one and two;
   a first device for imaging a first light stream in a first direction towards the photosensitive sensor;
   a second device for imaging a second light stream in a second direction towards the photosensitive sensor; and
   a transparent cover entirely enclosing the photosensitive sensor including the photosensitive surface of the photosensitive sensor in order to protect the photosensitive sensor, wherein at least a portion of the transparent cover is formed to include a light deflecting element for deflecting at least one of the light streams to enable the photosensitive surface of the photosensitive sensor to be exposed to light streams coming towards the photosensitive sensor from different directions.

5. The sensor of claim 4 wherein:
   the light deflecting element enables the photosensitive surfaces of the same optoelectronic converter elements to be exposed to light streams coming towards, the photosensitive sensor from different directions.

6. The sensor of claim 4 wherein:
   the light deflecting element is a prism.

7. The sensor of claim 4 wherein:
   the first device images the first light stream in a direction directly incident onto the photosensitive surface of the photosensitive sensor;
   the second device images the second light stream in a direction parallel with the photosensitive surface of the photosensitive sensor;
   the light deflecting element of the transparent cover deflects the second light stream onto the photosensitive surface of the photosensitive sensor.

8. The sensor of claim 4 wherein:
   the first device is a code disk.

9. The sensor of claim 4 wherein:
   the second device is a cycle counting element.

* * * * *